US008705603B2

(12) United States Patent
Coe et al.

(10) Patent No.: US 8,705,603 B2
(45) Date of Patent: Apr. 22, 2014

(54) ADAPTIVE DATA RECOVERY SYSTEM WITH INPUT SIGNAL EQUALIZATION

(75) Inventors: Tim Coe, Oxnard, CA (US); Greg Warwar, Ventura, CA (US)

(73) Assignee: Vitesse Semiconductor Corporation, Camarillo, CA (US)

( * ) Notice: Subject to any disclaimer, the term of this patent is extended or adjusted under 35 U.S.C. 154(b) by 622 days.

(21) Appl. No.: 12/366,544

(22) Filed: Feb. 5, 2009

(65) Prior Publication Data

US 2009/0274206 A1 Nov. 5, 2009

Related U.S. Application Data

(60) Provisional application No. 61/026,420, filed on Feb. 5, 2008.

(51) Int. Cl.
*H03H 7/40* (2006.01)

(52) U.S. Cl.
USPC .......................................... 375/232; 375/229

(58) Field of Classification Search
USPC .................................................. 375/229–236
See application file for complete search history.

(56) References Cited

U.S. PATENT DOCUMENTS

| | | | |
|---|---|---|---|
| 4,097,697 A | 6/1978 | Harman | |
| 4,218,771 A | 8/1980 | Hogge, Jr. | |
| 4,234,954 A | 11/1980 | Lange et al. | |
| 4,633,465 A | 12/1986 | Fitch et al. | |
| 5,295,155 A | 3/1994 | Gersbach et al. | |
| 5,533,072 A | 7/1996 | Georgiou et al. | |
| 5,598,439 A | 1/1997 | Wagner | |
| 5,610,953 A | 3/1997 | Betts et al. | |
| 5,717,728 A | 2/1998 | Hein et al. | |
| 6,178,213 B1 * | 1/2001 | McCormack et al. | 375/355 |
| 6,347,128 B1 | 2/2002 | Ransijn | |
| 6,359,941 B1 | 3/2002 | Den Bakker | |
| 6,463,109 B1 | 10/2002 | McCormack et al. | |
| 6,996,202 B2 | 2/2006 | McCormack et al. | |
| 7,092,466 B2 | 8/2006 | Hwang et al. | |
| 7,130,341 B2 * | 10/2006 | Haunstein et al. | 375/229 |
| 7,136,443 B2 | 11/2006 | Vallet et al. | |
| 7,149,269 B2 | 12/2006 | Cranford, Jr. et al. | |
| 7,206,368 B2 | 4/2007 | Engel et al. | |

(Continued)

OTHER PUBLICATIONS

Bulzacchelli et al., "A 10-Gb/s 5-Tap DFE/4-Tap FFE Transceiver in 90-nm CMOS Technology," IEEE Journal of Solid-State Circuits, vol. 41, Issue 12, pp. 2885-2900, Dec. 2006.

Garlepp et al., "A 1-10Gbps PAM2, PAM4, PAM2 Partial Response Receiver Analog Front End with Dynamic Sampler Swapping Capability for Backplane Serial Communications," Symposium on VLSI Circuits. Digest of Technical Papers. pp. 376-379, Jun. 16-18, 2005.

(Continued)

*Primary Examiner* — Sam K Ahn
*Assistant Examiner* — Janice Tieu
(74) *Attorney, Agent, or Firm* — Klein, O'Neill & Singh, LLP (57) ABSTRACT

Data receivers often include equalizers for operating on received signals. The equalizers often have a plurality of taps, with signals from each tap weighted based on tap settings or values. The tap settings may be set based on bit error rates of data output from the equalizer. In some embodiments data output from the equalizer is split into two signals, and the two signals are processed to indicate a data eye of the data output from the equalizer. Preferred tap settings may be determined by setting tap settings to different values and using tap settings expected to maximize the data eye. This may be performed separately for different bit settings in an attempt to reduce effects of inter-signal interference.

17 Claims, 6 Drawing Sheets

(56) References Cited

U.S. PATENT DOCUMENTS

| | | |
|---|---|---|
| 7,260,145 B2 | 8/2007 | Blanc et al. |
| 7,349,484 B2 | 3/2008 | Stojanovic et al. |
| 7,389,450 B2 | 6/2008 | Fleischer-Reumann et al. |
| 7,493,530 B2 | 2/2009 | Tan |
| 7,643,576 B2 | 1/2010 | Lai et al. |
| 7,684,478 B2 | 3/2010 | Cranford, Jr. et al. |
| 7,697,649 B2 | 4/2010 | Okamura |
| 7,721,134 B2 | 5/2010 | Cranford, Jr. et al. |
| 7,783,935 B2 | 8/2010 | Thayer |
| 7,812,749 B2 | 10/2010 | Abel et al. |
| 7,822,114 B2 | 10/2010 | Bulzacchelli et al. |
| 7,855,969 B2 | 12/2010 | Vogel et al. |
| 7,885,365 B2 | 2/2011 | Hagleitner et al. |
| 7,916,820 B2 | 3/2011 | Cranford, Jr. et al. |
| 2004/0268190 A1 | 12/2004 | Kossel et al. |
| 2005/0135518 A1 | 6/2005 | Vallet et al. |
| 2006/0171485 A1 | 8/2006 | Laturell et al. |
| 2006/0222123 A1 | 10/2006 | Mobin et al. |
| 2007/0052460 A1 | 3/2007 | Mobin et al. |
| 2007/0156360 A1 | 7/2007 | Romero |
| 2007/0268962 A1 | 11/2007 | Mobin et al. |
| 2007/0271052 A1 | 11/2007 | Abel et al. |
| 2010/0329322 A1 | 12/2010 | Mobin et al. |

OTHER PUBLICATIONS

Miller, Christopher M., "High-Speed Digital Transmitter Characterization Using Eye Diagram Analysis," Hewlett-Packard Journal, vol. 45, No. 4, Aug. 1994.

Momtaz et al., "A Fully Integrated 10-Gb/s Receiver with Adaptive Optical Dispersion Equalizer in 0.13-µm CMOS," IEEE Journal of Solid-State Circuits, vol. 42, Issue 4, pp. 872-880, Apr. 2007.

Stojanović et al., "Adaptive Equalization and Data Recovery in a Dual-Mode (PAM2/4) Serial Link Transceiver," Symposium on VLSI Circuits, Digest of Technical Papers, pp. 348-351, Jun. 17-19, 2004.

Stojanović et al., "Autonomous Dual-Mode (PAM2/4) Serial Link Transceiver With Adaptive Equalization and Data Recovery," IEEE Journal of Solid-State Circuits, vol. 40, No. 4, Apr. 2005.

Yang et al., "A 0.5-µm CMOS 4.0-Gbit/s Serial Link Transceiver with Data Recovery Using Oversampling," IEEE Journal of Solid-State Circuits, vol. 33, Issue 5, pp. 713-722, May 1998.

Zerbe et al., "1.6 Gb/s/pin 4-PAM Signaling and Circuits for a Multidrop Bus," IEEE Journal of Solid-State Circuits, vol. 36, Issue 5, pp. 752-760, May 2001.

\* cited by examiner

ADAPTIVE DATA RECOVERY SYSTEM WITH INPUT SIGNAL EQUALIZATION

CROSS REFERENCE TO RELATED APPLICATION

This patent application claims priority to Provisional Patent Application No. 61/026,420, filed on Feb. 5, 2008, the disclosure of which is incorporated herein by reference in its entirety.

BACKGROUND OF THE INVENTION

This invention relates generally to digital data communication systems, and more particularly to digital data communication systems for recovering clock signals and digital data from a serial data signal.

Modern data communication systems transmit and receive digital information at high data transmission rates. The digital information is often transmitted great distances over a variety of communication mediums such as electrically conducting wires, optical fibers, or by way of airwave transmissions. Great demands as to speed and reliability are placed on these systems. One measure of reliability of such systems is the bit error rate (BER) of the system, and modern communication systems generally should have exceedingly low bit error rates.

When a receiving unit in a data communication system receives a signal, generally an electrical or optical signal, containing digital information, the receiving unit is to recover the digital information from the signal. In other words, if a transmitter transmits a signal containing information corresponding to a particular bit sequence, then the receiving unit should recover the particular bit sequence from the received signal.

In addition, often the received data signal does not include a separate clock signal or other direct indication of the demarcation within the signal between the separate bits making up the signal. For example, when bit sequences are transmitted in a non-return to zero (NRZ) format, a logic 1 bit is indicated by a signal at a first energy level, and a logic 0 bit is indicated by a signal at a second (usually lower) energy level. The clock signal used to define the bit sequence by demarcating the bits within the sequence is not explicitly transmitted to the receiving unit. Data formats, such as NRZ, which do not provide inherent demarcation between bits in the data stream, are often desired because such formats have greater bandwidth as clock information is not explicitly transmitted in addition to the data. Accordingly, receiving units should generally be able to recover clock information from the received signal, and then use that recovered clock information to determine the bit sequences contained in the received signal.

Some systems use a phase locked loop (PLL) to determine a clock signal corresponding to the clock used to generate the data stream, PLLs use a clock generator generating a clock signal at what is hoped to be the same frequency as the clock frequency of the transmitter, and adjusts the phase of the generated clock signal to form a phase adjusted clock signal based on information implicitly contained in the data signal periodic transitions, generally positive edge transitions, of the phase adjusted clock signal are used as timing points at which the data signal is sampled by comparing the data signal to a set energy level. If the energy level (usually in volts) is above the set energy level, a logic 1 bit is placed in the bit sequence. If the energy level is below the set energy level, a logic 0 is placed in the bit sequence.

Figure 1:
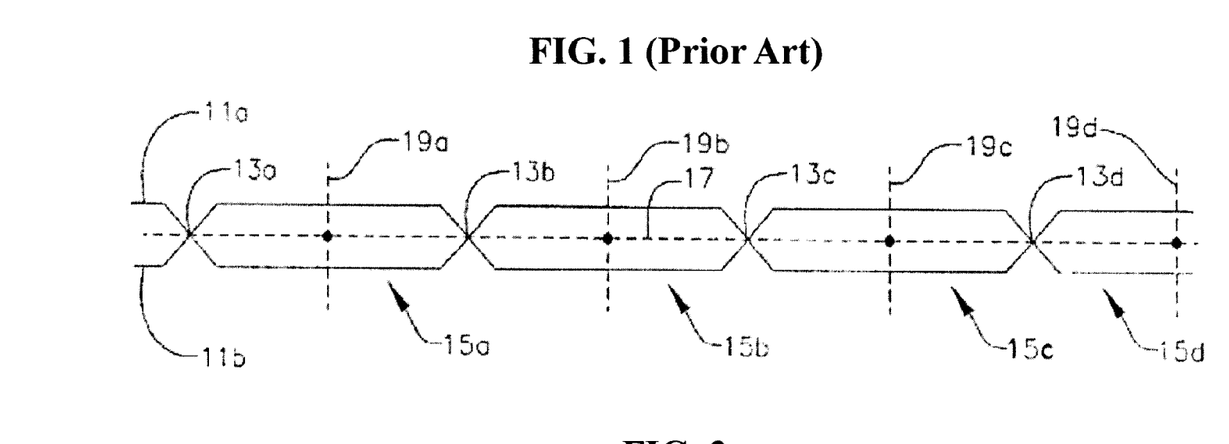
FIG. 1 illustrates a semi-idealized incoming data waveform.

FIG. 1 illustrates dual semi-idealized digital waveforms of data signals. A y-axis represents voltage of the data signals, and an x-axis represents time. As illustrated, a waveform of a first data signal 11a represents a binary sequence of alternating logic 1s and 0s. A waveform of a second data signal 11b represents the complement of the alternating binary sequence of the first binary sequence. The waveforms deviate from ideal waveforms in that each has a finite rise time and fall time when transitioning to and from a logic level 1 and a logic level 0.

The waveforms are divisible over time into a number of data cells 15a, 15b, 15c, 15d. Each of the data cells 15a, 15b, 15c, 15d represents one bit of data in a sequence of bits. In order to reconstruct the transmitted binary sequence the data signal is sampled and compared once for each data cell, generally at the expected midpoint in time of the data cell. Sampling is performed at defined intervals, generally in what is expected to be the middle of the period of an idealized data cell. Comparing is accomplished by comparing an energy level, generally a voltage, of the data signal with a pre-defined energy level, or voltage, which is generally in the middle of the expected range of energy levels. Thus, if the first data signal 11a is sampled once in each of the data cells 15a, 15b, 15c, 15d at times 19a, 19b, 19c, 19d using a voltage reference 17, the resulting bit pattern is 0101. Similarly sampling the second data signal results in a bit pattern of 1010.

Such systems are prone to errors, however. Slight differences in frequency between the transmitter clock and the clock generator of the receiving unit may lead to data recovery errors over time, or at least require periodic reacquisition of the correct phase adjusted clock signal, with a loss of bandwidth during the reacquisition period. In addition, deviations from an ideal transmitted data signal and distortions in transmitted signals, whether generated by properties of the transmitter, the communication medium, or otherwise, may result in data recovery errors. There are many causes of such deviations and distortions, and the deviations may change from transmitted bit to transmitted bit as well as exhibit both drift and an increase in the magnitude of the deviations over time as components age.

The transmitter may transmit signals that deviate from the ideal in terms of rise time, fall time, and energy levels. These deviations may vary from transmitter to transmitter, and even over time for a single transmitter. To an extent, these deviations may also vary from bit to bit for a single transmitter. Additionally, the transmitter and receiving unit may not have clocks perfectly aligned in frequency or phase, thus increasing the difficulty in the translation. Further, properties of the communication medium may distort the transmitted signals, and a receiver utilized by the receiving unit may also cause distortion of the signals.

BRIEF SUMMARY OF THE INVENTION

An aspect of an embodiment of the present invention is directed toward a unit, preferably part of an integrated circuit, for example, providing physical layer functions in a communication system, that filters offset and time delayed samples of the incoming data stream by utilizing a pattern matching scheme. This filtering (e.g., pattern matching) of incoming data stream around where measurement has occurred allows the determination of sampling node eye characteristics to be evaluated across several different incoming bit patterns and computations to be performed in subsequent hardware and software that give a more effective measurement of sampling node eye quality. Also, adjustments to an equalization amplifier (or equalization filter) can be more effectively evaluated as to whether they improve or hurt the sampling node eye quality.

Another aspect of an embodiment of the present invention is directed toward a summing circuit of an equalization amplifier that utilizes an inductively peaked cascode stage.

In one aspect the invention provides a method for setting tap values for an adaptive equalizer, comprising: setting the tap values for an adaptive equalizer to a first set of values; sampling and comparing an output of the adaptive equalizer at a first phase and first voltage, the first phase and the first voltage being within a data cell of the output of the adaptive equalizer; sampling and comparing the output of the adaptive equalizer at a second phase and second voltage, the second phase and the second voltage being within the data cell of the output of the adaptive equalizer; determining if the sampled and compared output of the adaptive equalizer at the first phase and first voltage matches the sampled and compared output of the adaptive equalizer at the second phase and second voltage; and adjusting at least one tap value for the adaptive equalizer based on a determination that the sampled and compared output of the adaptive equalizer at the first phase and first voltage does not match the sampled and compared output of the adaptive equalizer at the second phase and second voltage.

In another aspect the invention provides circuitry for setting tap values for an equalizer, comprising: first data recovery circuitry configured to recover data from a data stream, the data stream being recovered from an output of the equalizer; second data recovery circuitry configured to recover data from the data stream, the data stream being recovered from the output of the equalizer; comparison circuitry configured to compare data recovered from the first data recovery circuitry with data recovered from the second data recovery circuitry; counting circuitry configured to count a number of times the comparison circuitry indicates data recovered from the first data recovery circuitry does not match data recovered from the second data recovery circuitry; control circuitry configured to set at least one tap value of the equalizer based on the number of counted times.

In another aspect the invention provides a method of determining tap values for an equalizer in a receiver comprising: setting tap values to a plurality of different sets of values and, for each of the plurality of different sets of values: recovering data output from the equalizer in a first data channel and recovering data output from the equalizer in a second data channel; and determining a number of times data recovered from the first data channel does not match data recovered from the second data channel; and setting the tap values to a one of the plurality of different sets of values for which the number of times data recovered from the first data channel does not match data recovered from the second data channel indicates the lowest bit error rate.

These and other aspects of the invention are more fully comprehended upon review of this disclosure.

DETAILED DESCRIPTION

In the following detailed description, only certain exemplary embodiments in accordance with the invention are shown and described, by way of illustration. As those skilled in the art would recognize, the invention may be embodied in many different forms and should not be construed as being limited to the embodiments set forth herein. Also, in the context of the present application, when an element is referred to as being "connected" or "coupled" to another element, it can be directly connected or coupled to the another element or be indirectly connected or coupled to the another element with one or more intervening elements interposed therebetween.

Figure 2:
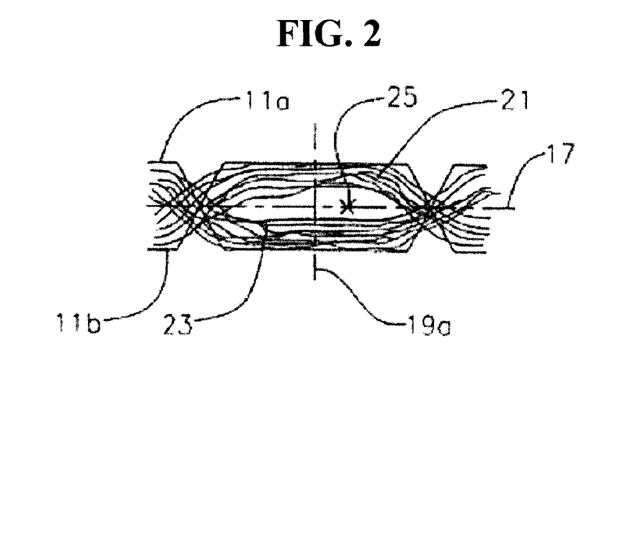
FIG. 2 illustrates a data cell of the semi-idealized waveform of FIG. 1, along with an example data-eye of an expected actual waveform.

FIG. 2 illustrates a possible actual data-eye of a single data cell. The data eye is formed by superimposing waveforms of a plurality of data signals over a single data cell. A first plurality of varying data signals 21 are data signals having the same bit sequence as the first data signal 11a, and a second plurality of varying data signals 23 are data signals having a bit sequence corresponding to the bit sequence of the second data signal 11b. As illustrated, the plurality of data signals vary substantially from the data signals. The plurality of data signals generally to do not reach the expected upper voltage level, or the expected lower voltage level. The plurality of data signals additionally exhibit increased rise times, decreased steady state times, and increased fall times. In addition to varying from the data signals, the plurality of data signals vary from each other, having different waveforms. Moreover, the variations in rise time, fall time, and steady state time are not symmetric. That is, the center 25 of the data cell is not the point most equidistant from all of the waveforms making up the data-eye. Accordingly, sampling and comparing the center of the idealized data-eye may not result in the lowest likelihood that a particular data bit will be correctly recovered, and therefore is not expected to result in the lowest bit error rate.

Figure 3:
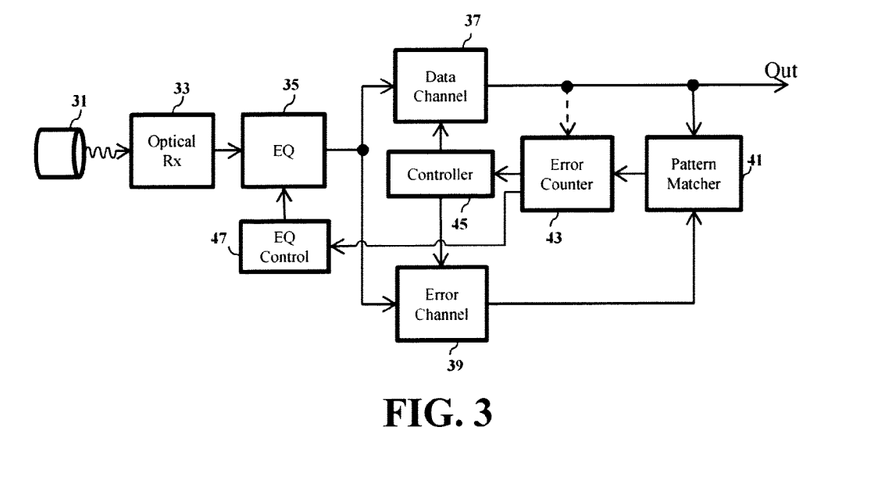
FIG. 3 illustrates a semi-schematic block diagram of a data recover unit according to an embodiment of the present invention for obtaining digital data from an incoming data stream transported over a fiber optic cable.

FIG. 3 illustrates a block diagram of data recovery related circuitry in accordance with aspects of the present invention. A data signal is transmitted over a fiber optic cable 31 by a transmitter (not shown). The fiber optic cable 31 is coupled to an optical receiver 33. The optical receiver 33 receives the light transmissions transmitted by the fiber optic cable 31 and converts those light transmissions into electrical signals. Fiber optic cables 31 and optical receivers 33 are well known in the art, and are widely available from a variety of sources. In some communication networks wavelength division multiplexing is used in which signals corresponding to the input optical signal are composed of a plurality of signals each transmitted at differing wavelengths, with the plurality of signals transmitted simultaneously (or concurrently) over the same optical fiber. Such signals are generally wavelength demultiplexed by the optical receiver or some other component, and apparatus and methods for doing so are well known in the art. Accordingly, for ease of further description, it will be assumed that the input optical signal is composed of a single data signal. Generally, the fiber optic cable 31 and optical receiver 33 unit are not components of clock and data recovery units. For purposes of clarity of description, however, they are included in FIG. 3 and in other figures described herein.

According to an embodiment of the present invention, an output signal from the optical receiver output is received by an equalization amplifier 35. The equalization amplifier 35 is in one embodiment an adaptive finite impulse response (FIR) filter with n taps. Tap weights of the taps may be controlled or adjusted by an equalization amplifier controller 47.

An output signal from the equalization amplifier 35 is received by, for example, data channel circuitry 37 and error channel circuitry 39. In various embodiments, the channel circuitry may not be used for provision of data output signals, but instead used for other purposes, for example to determine BERs, tap settings, or provide some other functions. Similarly the error channel may similarly be used, or not used, for other purposes. For example, in some embodiments, circuitry for the channels may be utilized, as described, solely for purposes of providing information used in setting of equalization amplifier tap settings.

The data channel circuitry 37 samples and compares the output of the equalization amplifier 35 to form a data out signal, for example for use by a receiving system of which the data recovery related circuitry may be a part. The error channel circuitry 39 also samples and compares the output of the equalization amplifier 35.

The data channel output signal and the error channel output signal are provided to a pattern matcher 41. The pattern matcher 41 compares the data channel output signal and the error channel output signal when a bit pattern of at least one of the data channel output signal and the error channel output signal matches a predefined bit pattern. In many embodiments, the pattern matchers only compare a particular bit of the data channel output when the bit pattern is present in preceding bits, or in subsequent bits, or a combination of preceding and subsequent bits. These sampling errors are communicated to the error counter 43, which provides error information to the controller 45 and to the equalization amplifier controller 47. The controller 45 uses the information to adjust the sampling and comparing by the data channel in order to minimize receiving unit bit error rates. The equalization amplifier controller 47 uses the information to adjust the tap weights of the equalization amplifier 35 in order to further reduce bit error rates. Thus, the circuitry of FIG. 3, for example the controller and equalization amplifier controller, can use error statistics corresponding to variations of the signal performed by the error channel circuitry 39 to determine the data eye, and/or to adaptively filter the input signal.

Figure 4:
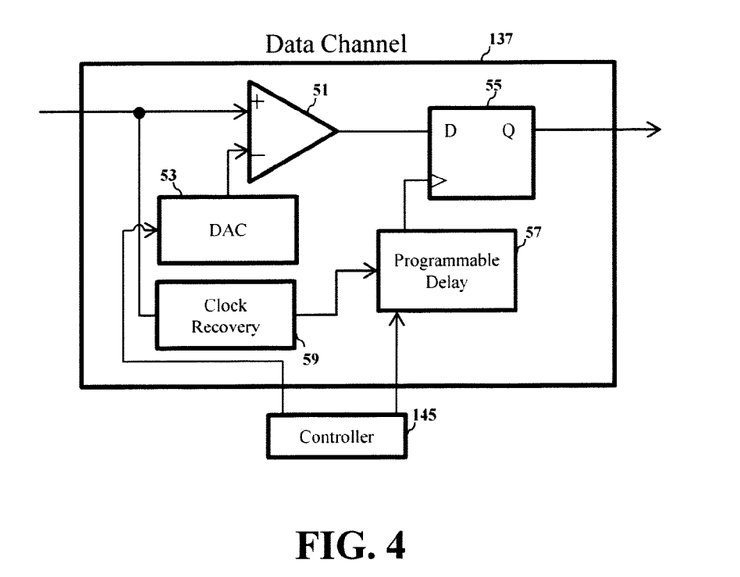
FIG. 4 illustrates a semi-schematic block diagram of data channel circuitry for sampling data in accordance with aspects of the present invention.

FIG. 4 illustrates an embodiment of a data channel circuitry 137. In one embodiment of the present invention, the data channel circuitry 137 may be used as the data channel circuitry 37 of FIG. 3. The data channel circuitry 137 of the embodiment of FIG. 4 includes a data path comparator 51 that compares a signal to a voltage threshold. The signal may be generated for example, by an equalization amplifier such as discussed with respect to FIG. 3. The voltage threshold is generated by a digital-to-analog converter 53 based on a bit pattern generated by a controller 145. The output of the data channel comparator 51 is provided to a data channel latch 55 as a data channel latch data input signal.

The signal generated by the equalization amplifier 35 is also provided to a clock recovery unit (CRU) 59. The CRU may be, for example, a PLL-based CRU. In another embodiment, the CRU is external to the data channel circuitry 137, providing a clock signal to the data channel circuitry 37 and the error channel circuitry 39. In the embodiment of FIG. 4, the CRU determines a master clock signal based on the equalization amplifier 35 output signal and a reference clock signal. The data channel latch 55 is also provided a data channel clock signal from a programmable delay circuit 57. When the data channel clock signal transitions from a logic 0 state to logic 1 state the data channel latch sets a data out signal to the same logic value as the data channel latch data input signal.

The data channel clock signal provided to the data channel latch 55 is generated by a data channel programmable delay element 57. The data channel programmable delay element 57 receives the master clock signal generated by the CRU 59. The data channel programmable delay element 57 delays the clock signal generated by the CRU as instructed by the controller 145.

In one embodiment, the error channel circuitry 39 forms a mirror image of the data channel circuitry 137, and therefore also includes an offset and phase that are controllable by the controller 145. The error channel circuitry, and also data channel circuitry and aspects of the circuitry relating to determination and/or counting of errors may be as discussed in U.S. Pat. No. 6,178,213 or U.S. Pat. No. 6,463,109, the disclosures of both of which are incorporated herein by reference in their entirety.

Referring back to FIG. 3, the signals from the data channel circuitry 37 and the error channel circuitry 39 are provided to a pattern matcher 41. The pattern matcher 41 compares the signals for example over an 8-bit or 16-bit window, and if they are not the same, sends an error signal to the error counter 43. In some embodiments, the pattern matcher additionally receives, or forms, a pattern, and compare the signals when one of the signals, for example the data channel signals matches the pattern.

The output of the pattern matcher 41 is provided to an error counter 43. The error counter 43 determines the number of bit errors occurring over a predefined (or set) period of time and provides that information, corresponding to a bit error rate between the data signal and the error signal, to the controller 45 and the equalization amplifier controller 47. In another embodiment, the equalization controller 47 is not used, and the controller 45 also provides equalization amplifier control signals.

The controller 45 has control of the delays used to determine sampling points and of the voltages used as comparison references, and is therefore able to determine the shape of the waveforms 21 and 23, and thus the shape of the data eye, of the equalization amplifier 35 output signal.

This may be accomplished by initially placing the compare and sample point at the expected middle of the data cell. Thereafter the compare and sample point is moved up in the data cell, i.e. the compare voltage is incrementally increased, until the bit error rate between the error out signal and the data out signal reaches a predefined (or set) level. The controller 45 stores this compare and sample point as one point defining the edge of the data eye. The compare and sample point for the error channel is then moved down in the data cell, e.g., the reference voltage is incrementally decreased, until the predefined bit error rate is reached. The compare and sample point is then once again placed at the expected middle of the data cell, and the sample point is phase shifted in time towards the left, i.e. the beginning, of the data cell. The process is then repeated for the right edge of the data cell, as well as each diagonal direction within the data cell, to provide eight points. The controller 45 then uses the eight points in the data cell so located to determine a "center of gravity," or point equidistant in voltage and time from the eight points, of the data cell. The center of gravity of the data cell is then used by the controller 45 to determine the compare and sample point for use in the data channel.

In another embodiment, the compare and sample point is moved up in the data cell, and the bit error rate between the error out signal and the data out signal is tracked. The bit error rates are tabulated to determine rates of change of bit error rates with respect to phase or voltage changes in the sampling point. The locations approximate the steepest slope, e.g., where the bit error rate increases substantially are identified as cell edge boundaries.

In one embodiment, a convenient way to determine data eye form, particularly with respect to voltage, is to first place a sampling point for one channel at a maximum, particularly a maximum voltage. At a maximum voltage data from a data stream is expected to be all logic highs. The sampling point for a second channel is then adjusted. For data signals having a uniform data density, a data eye is defined by bit error rates between the first and second channels appropriate for the uniform data density.

In another embodiment, the sample point at the bottom of the steepest slope of a graph of bit errors versus sampling point location is determined to be the edge of the data eye. Alternatively, logarithmic plots are developed based on the bit error rates and the edges of the data eye is extrapolated from the logarithmic plots.

In alternative embodiments the compare and sample point is initially placed without regard for the location, expected or otherwise, of the center of the data cell. Instead, the compare and sample point is moved throughout the cell, particularly with respect to phase, to determine data transition boundaries. Regions of high bit error rates define data transition boundaries.

By constantly repeating one or more of the above processes, the receiving unit adaptively adjusts to time varying changes in the shape of the data eye.

Figure 5:
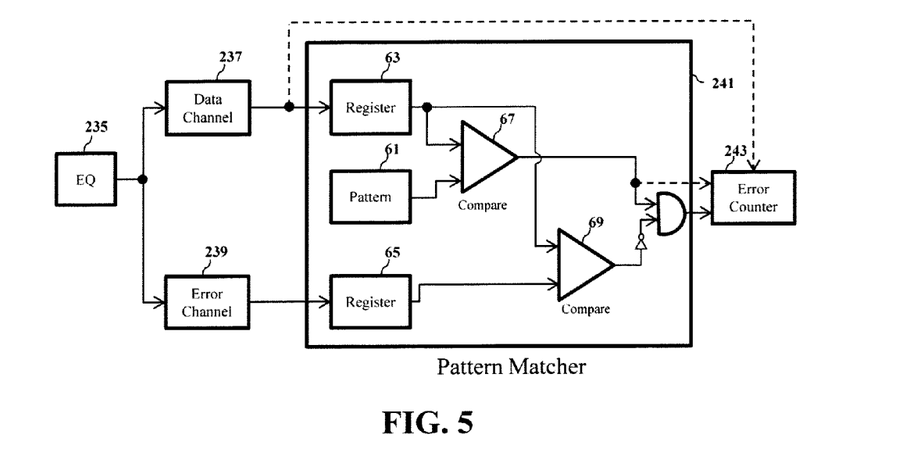
FIG. 5 illustrates a semi-schematic block diagram of a pattern matcher for comparing bit stream on the data channel to a stored bit pattern, and also to data on the error channel in accordance with aspects of the present invention.

An embodiment of a pattern matcher 241 is illustrated in FIG. 5. As shown in FIG. 5, an output signal from the equalization amplifier 235 can be received by data channel circuitry 237 and error channel circuitry 239. The signals from the data channel circuitry 237 and the error channel circuitry 239 can then be provided to the pattern matcher 241. The pattern matcher 241 can then compare the signals, and send an error signal to an error counter 243. In one embodiment of the present invention, the pattern matcher 241 may be used as the pattern matcher 41 of FIG. 3. In more detail, the pattern matcher 241 of the embodiment of FIG. 5 includes a bit pattern stored in a pattern register 61, which in this embodiment is an 8-bit register, but the present invention is not thereby limited. For example, the pattern register can be a register for registering any suitable number of bits. In various embodiments, the bit pattern can be user-defined, or set by an external controller. The input signal from a data channel 237 is stored in a register 63. The data in the register 63 is compared to the bit pattern in the pattern register 61. The pattern matcher 241 also compares the data from the data channel register 63 with error channel data stored in error channel register 65. If the data from the data channel register 63 matches the given pattern, and if the data from the data channel register 63 does not match the data from the error channel register 65, this indicates that the two signals (data and error) were sampled and compared on different sides of a transition in the equalization amplifier 235 output signal. The output of the compare circuit 67, and/or the data from the data channel 237 may also be provided to the error counter 243, so that it may accurately calculate the bit error rate as the number of errors per bit, and/or the number of errors per pattern match. Accordingly, the output of the pattern matcher 241 can be used to determine the waveforms of data transitions in the received signal when that received signal matches the predefined bit pattern, and therefore determine the boundaries of the data eye for the system when the data matches that bit pattern.

Figure 6:
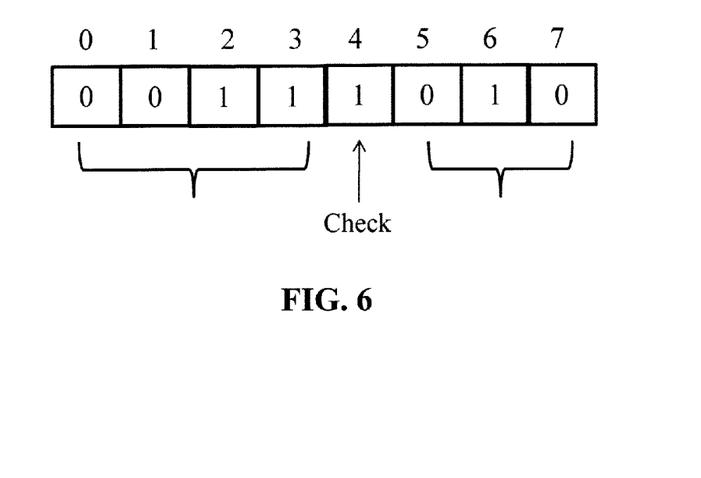
FIG. 6 illustrates an exemplary bit pattern stored in the bit pattern register in accordance with aspects of the present invention.

In this case, error statistics for one bit that depend on the pattern of bits that are adjacent to the one being inspected can be obtained. For example, for an 8-bit pattern stored in the bit pattern register 61, as illustrated in FIG. 6, error statistics for bit 4 depend on the data in bits 0-3 and bits 5-7. This intersymbol interference (ISI) can have several causes, such as pulse spreading through the channel. The compare circuit 67 thus compares bits 0-7 of the data stored in the data register 63 and the pattern register 61. In one embodiment, a second compare circuit 69 compares bits 0-7 in the data register 63 with the data in the error register 65. In another embodiment, the second compare circuit 69 only compares bit 4 from registers 63 and 65. In either embodiment, bit 4 (the bit in question) is a known and filtered value in the data channel, but is an unknown value in the error channel. Thus, the output of the pattern matcher 241 indicates an error only when the data on the data channel matches the pattern in the bit pattern register 61 and when bit 4 does not match in the data channel and the error channel.

As discussed above, the details of the data eye are obtained based on errors in a bit of data caused by controlled variations of an offset and phase of a data channel and an error channel. However, simply having a data eye for one bit may not be enough information to control an input equalization amplifier 35. Using this pattern matching system and sweeping through a large number of bit sequences, and thus knowing the eye opening for a given bit within these bit patterns provides much more information, and allows ISI compensation on a bit stream based on where the given bit falls within a bit sequence.

The error statistics depend on the pattern of bits that are adjacent to the one being inspected. For example, if an embodiment has a series of zeros followed by one bit that is equal to 1, which is then followed by another series of zeros, or if an embodiment has a series of zeros followed by a transition to a series of ones, the error statistics of the bit under question will vary. Obtaining these variations for a large number of bit patterns provides information that can be used to control the equalization amplifier 35.

Figure 7:
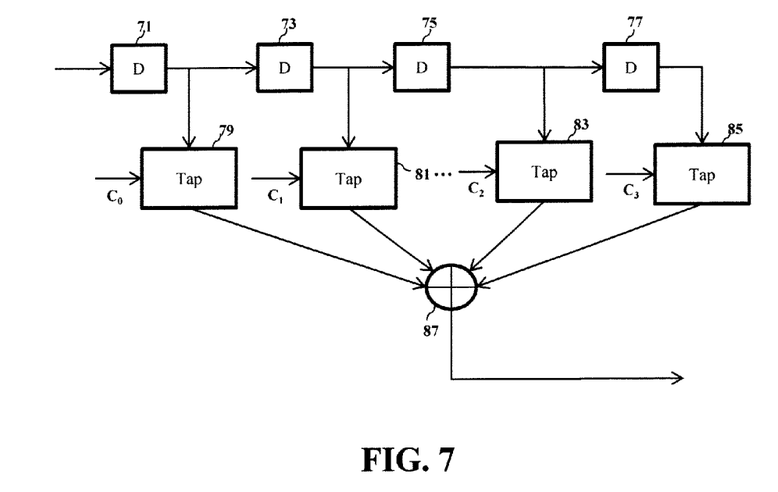
FIG. 7 illustrates a semi-schematic block diagram of an equalization amplifier for shaping the signal output by the optical receiver in accordance with aspects of the present invention.
Figure 8:
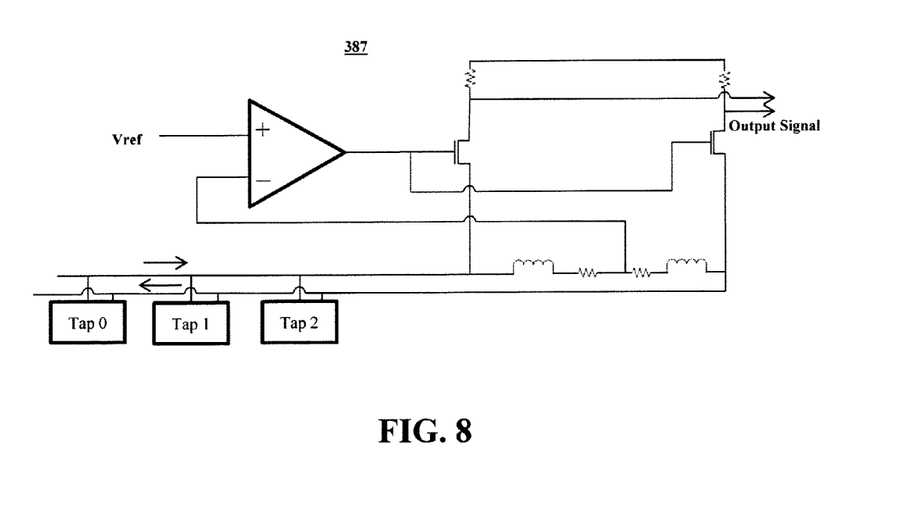
FIG. 8 illustrates a semi-schematic block diagram of a summing circuit of the equalization amplifier in accordance with aspects of the present invention.

FIG. 7 illustrates an input equalization amplifier that may be used as the equalization amplifier 35 according to an embodiment of the present invention. The amplifier includes delay blocks 71, 73, 75, 77, and taps 79, 81, 83, 85. The taps have coefficients C that are adjustable, and are controlled by the equalization amplifier controller 47. The coefficients together form a set of tap values or tap weights, and serve to weight the tap amounts in accordance with the tap values. The output signals of the taps $C_o$-$C_n$ are summed by summing block 87, which generates the output signal. An exemplary embodiment of a summing block 87 may be implemented as embodied in FIG. 8. Here, as shown in FIG. 8, the summing block 387 utilizes an inductively peaked cascode stage for summing the taps 79, 81, 83, 85 of the input equalization amplifier 35 that are located relatively far apart from each other such that differential summed output signals can be provided.

Figure 9:
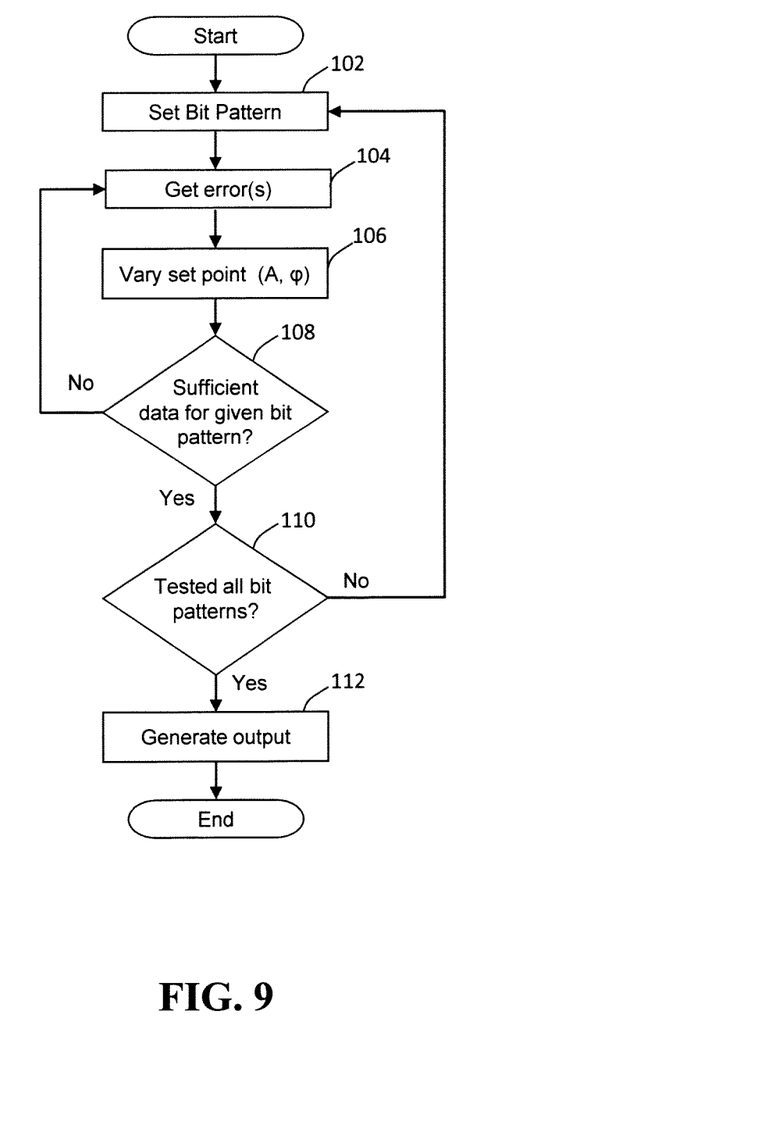
FIG. 9 illustrates a flow diagram for using adaptive equalization in accordance with aspects of the present invention.

FIG. 9 is a flow diagram illustrating a method for adaptive equalization according to an exemplary embodiment of the present invention. The method begins by setting the bit pattern in the bit pattern register 61 of the pattern matcher 41 (102). The system then tests for errors using this bit pattern (104). In this step, the data is stored in the data channel register 63, and repeatedly compared to the stored bit pattern. Essentially, the system waits, looking at basically random data patterns, until the data matches the stored bit pattern. When the data in the data channel register 63 matches the bit pattern stored in bit pattern register 61, the output of compare circuit 67 goes high. Compare block 69 compares the data in data channel register 63 with the data in error channel register 65. If these are not the same, the output of the pattern matcher will be high, and the error counter will be incremented. This process (104) may be repeated as many times as desired for a particular bit pattern.

After errors are obtained for the given bit pattern, the set points of the data channel circuitry 37 and the error channel circuitry 39 can be adjusted by the controller 45 (106). Varying these parameters in the data channel circuitry 37 can fine-tune the data acquisition, and varying them in the error channel circuitry 39 can improve the data eye measurement.

If sufficient data for a given bit pattern has been received (108), and if the pattern matcher has tested all the bit patterns that it needs or is to test (110), the system generates an output to control one or both of an eye diagram, or a figure of merit of the eye diagram (112). The control of the eye diagram is accomplished as described above, by changing the offset or the phase used in the data acquisition of the data channel circuitry 37 and the error channel circuitry 39. The figure of merit of the data eye quality is generated by the equalizer control circuit 47. This figure of merit relates to the eye quality across multiple bit sequences. Using this information, the equalizer controller 47 generates the coefficients of the taps in the equalizer 35, allowing input signal conditioning and further reducing bit error rates.

For example, in some embodiments tap weights are set to a first value, and numbers of errors for a particular bit sequence are determined. The errors in many embodiments are determined by setting an error channel set point such that a particular BER would be expected, or at a point expected to represent 50% height (voltage) of an expected data eye, or some other position. The number of errors may be determined over a period of time in some embodiments, or over a predetermined number of times the particular bit sequence has been received in other embodiments.

One or more tap weights are then changed. The errors for the predetermined bit sequence are then determined again, and the tap weight with the lowest error count is selected, at least for this iteration. By repeatedly changing tap weight settings over time in this matter preferred tap weight settings may be arrived at.

Figure 10:
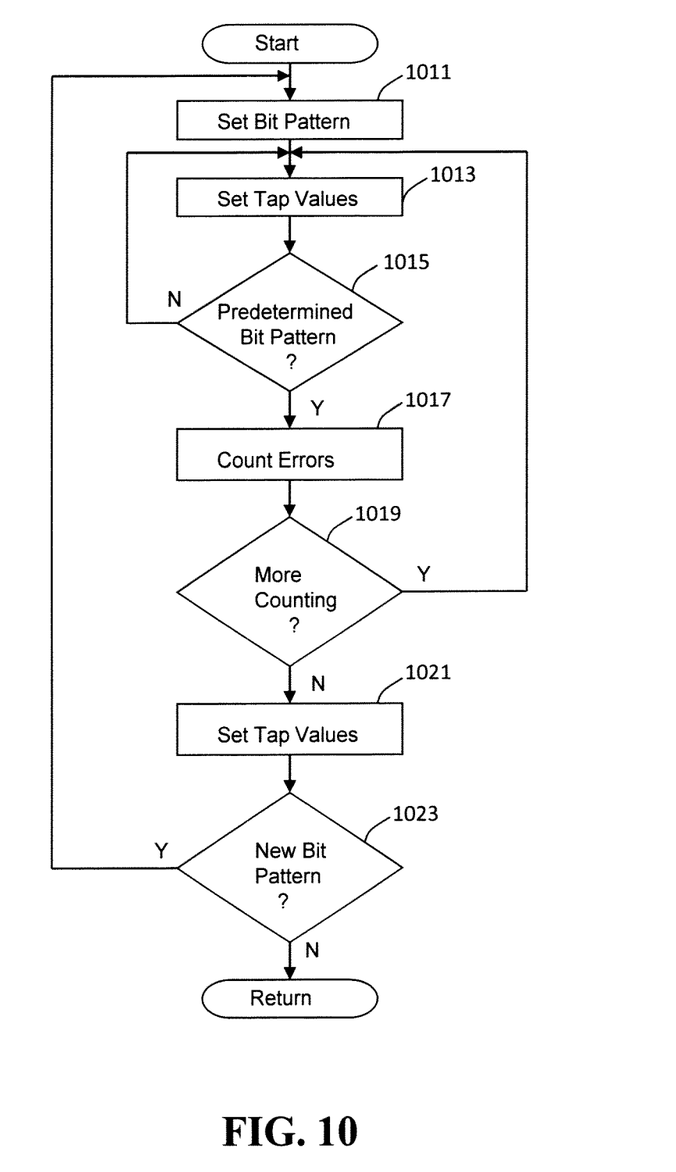
FIG. 10 illustrates a further flow diagram for using adaptive equalization in accordance with aspects of the invention.

FIG. 10 is a flow diagram of a process in accordance with the above. The process may be implemented, for example, by circuitry described herein. In block 1011 the process sets a bit pattern for matching. In block 1013 the process sets tap values for an equalization amplifier. In block 1015 the process checks to see if the set bit pattern has been received. If so, the process determines errors between a first channel and a second channel, with each of the first channel and the second channel sampling the same data stream, but possibly at different phase and voltage offsets. In general, the detection of the set bit pattern and counting of errors occurs for a period of time in which the data stream will include the set bit pattern numerous times. Considering that data streams may provide data at, for example, 2.5 GHz or 10 GHz, the period of time need not necessarily be extensive to receive the set bit pattern a large number of times.

In block 1019 the process determines if counting of errors for the same set bit pattern, but a different tap weighting, should be performed. If so, the process goes to block 1013 and sets new tap weightings or values. If not, the process sets tap values for data recovery to the tap values for the bit pattern which indicated a lowest bit error rate.

The process in block 1023 determines if a new bit pattern should be used. If not the process exits, although it should be noted that in many embodiments the process continues operation continuously. If a new bit pattern should be used the process goes to block 1011 and sets a new bit pattern for matching.

While the present invention has been described in connection with certain exemplary embodiments, it is to be understood that the invention is not limited to the disclosed embodiments, but, on the contrary, is intended to cover the novel and unobvious claims and their insubstantial variations supported by this disclosure.

The invention claimed is:

1. A method for setting tap values for an adaptive equalizer, comprising:
   setting the tap values for an adaptive equalizer to a first set of values;
   for a plurality of different data cells, sampling and comparing an output of the adaptive equalizer at a first phase and first voltage, the first phase and the first voltage being within a data cell of the output of the adaptive equalizer;
   for the plurality of different data cells, sampling and comparing the output of the adaptive equalizer at a second phase and second voltage, the second phase and the second voltage being within the data cell of the output of the adaptive equalizer;
   determining if the sampled and compared output of the adaptive equalizer at the first phase and first voltage matches the sampled and compared output of the adaptive equalizer at the second phase and second voltage and the sampled and compared output at the first phase and voltage for at least some of the plurality of different data cells matches a predefined bit pattern; and
   adjusting at least one tap value for the adaptive equalizer based on a determination that the sampled and compared output of the adaptive equalizer at the first phase and first voltage does not match the sampled and compared output of the adaptive equalizer at the second phase and second voltage.

2. The method of claim 1 further comprising performing, a plurality of times, each time of the plurality of times for different data cells:
   sampling and comparing the output of the adaptive equalizer at the first phase and first voltage,
   sampling and comparing the output of the adaptive equalizer at the second phase and second voltage, and
   determining if the sampled and compared output of the adaptive equalizer at the first phase and first voltage matches the sampled and compared output of the adaptive equalizer at the second phase and second voltage.

3. The method of claim 2 wherein the adjusting at least one tap value for the adaptive equalizer based on the determination that the sampled and compared output of the adaptive equalizer at the first phase and first voltage does not match the sampled and compared output of the adaptive equalizer at the second phase and second voltage comprises adjusting at least one tap value for the adaptive equalizer based on a number of times the sampled and compared output of the adaptive equalizer at the first phase and first voltage does not match the sampled and compared output of the adaptive equalizer at the second phase and second voltage.

4. The method of claim 3, wherein the sampled and compared data cell from the output of the adaptive equalizer is a data cell within the predetermined bit pattern.

5. The method of claim 4 wherein the adjusting at least one tap value is based on the number of times the sampled and compared output of the adaptive equalizer at the first phase and the first voltage does not match the sampled and compared output of the adaptive equalizer at the second phase and the second voltage for a particular data cell within the different data cells matching the predefined bit pattern.

6. The method of claim 4 further comprising changing the predefined bit pattern over time.

7. The method of claim 2 further comprising, for each of a plurality of different tap values, performing, a plurality of times, each time of the plurality of times for different data cells:
  sampling and comparing the output of the adaptive equalizer at the first phase and first voltage,
  sampling and comparing the output of the adaptive equalizer at the second phase and second voltage, and
  determining if the sampled and compared output of the adaptive equalizer at the first phase and first voltage matches the sampled and compared output of the adaptive equalizer at the second phase and second voltage.

8. The method of claim 7 wherein the adjusting at least one tap value for the adaptive equalizer based on the determination that the sampled and compared output of the adaptive equalizer at the first phase and first voltage does not match the sampled and compared output of the adaptive equalizer at the second phase and second voltage comprises setting the tap values to the tap value of the plurality of different tap values for which the sampled and compared output of the adaptive equalizer at the first phase and first voltage does not match the sampled and compared output of the adaptive equalizer at the second phase and second voltage the least number of times.

9. The method of claim 1 wherein only one of either the first phase and the second phase or the first voltage and second voltage are different.

10. The method of claim 1 further comprising changing at least one of the first phase and the first voltage over time.

11. Circuitry for setting tap values for an equalizer, comprising:
  first data recovery circuitry configured to recover data from a data stream, the data stream being recovered from an output of the equalizer;
  second data recovery circuitry configured to recover data from the data stream, the data stream being recovered from the output of the equalizer;
  comparison circuitry configured to compare data recovered from the first data recovery circuitry with data recovered from the second data recovery circuitry when data recovered from at least one of the first data recovery circuitry or the second data recovery circuitry matches a predefined bit pattern;
  counting circuitry configured to count a number of times the comparison circuitry indicates data recovered from the first data recovery circuitry does not match data recovered from the second data recovery circuitry;
  control circuitry configured to set at least one tap value of the equalizer based on the number of counted times.

12. The circuitry of claim 11 wherein the comparison circuitry is further configured to compare at least one of the data recovered from the first data recovery circuitry and the data recovered from the second data recovery circuitry with a predefined bit pattern.

13. The circuitry of claim 12 wherein the comparison circuitry is further configured to indicate that data recovered from the first data recovery circuitry does not match data recovered from the second data recovery circuitry only for data included in the predefined bit pattern.

14. The circuitry of claim 13 wherein the control circuitry is configured to set the tap values to a plurality of different sets of tap values, and to select a one set of tap values of the plurality of different sets of tap values based on the set of tap values of the plurality of different sets of tap values with the least number of counted times.

15. The circuitry of claim 14 further comprising equalizer circuitry implementing the equalizer, the equalizer circuitry including a summer for summing outputs of taps of the equalizer, the summer including an inductively peaked cascade stage.

16. A method of determining tap values for an equalizer in a receiver comprising:
  setting tap values to a plurality of different sets of values and, for each of the plurality of different sets of values:
  recovering data output from the equalizer in a first data channel and recovering data output from the equalizer in a second data channel; and
  determining a number of times data recovered from the first data channel does not match data recovered from the second data channel and whether the output of one of the first data and the second data channel matches a predefined bit pattern; and
  setting, the tap values to a one of the plurality of different sets of values for which the number of times data recovered from the first data channel does not match data recovered from the second data channel indicates the lowest bit error rate.

17. The method of claim 16 further comprising, for each of the plurality of different sets of values, setting a bit pattern to a plurality of different bit patterns, and wherein determining the number of times data recovered from the first data channel does not match data recovered from the second data channel comprising determining the number of times data recovered from the first data channel does not match data recovered from the second data channel for the set bit pattern.

* * * * *